US012796697B2

(12) United States Patent
Bryckaert et al.

(10) Patent No.: US 12,796,697 B2
(45) Date of Patent: Nov. 17, 2026

(54) STABILIZED, READY-TO-USE LIVE LEAVEN

(71) Applicant: LESAFFRE ET COMPAGNIE, Paris (FR)

(72) Inventors: Emilie Bryckaert, Wambrechies (FR); Anne Desmons, Rety (FR); Alban Depierre, Armentières (FR)

(73) Assignee: LESAFFRE ET COMPAGNIE, Paris (FR)

( * ) Notice: Subject to any disclaimer, the term of this patent is extended or adjusted under 35 U.S.C. 154(b) by 214 days.

(21) Appl. No.: 18/705,162

(22) PCT Filed: Oct. 21, 2022

(86) PCT No.: PCT/EP2022/079480
§ 371 (c)(1),
(2) Date: Apr. 26, 2024

(87) PCT Pub. No.: WO2023/072783
PCT Pub. Date: May 4, 2023

(65) Prior Publication Data

US 2025/0000103 A1 Jan. 2, 2025

(30) Foreign Application Priority Data

Oct. 27, 2021 (FR) ...................................... 2111427

(51) Int. Cl.
*A21D 8/04* (2006.01)

(52) U.S. Cl.
CPC .................................. *A21D 8/045* (2013.01)

(58) Field of Classification Search
CPC ..................................................... A21D 8/045
See application file for complete search history.

(56) References Cited

U.S. PATENT DOCUMENTS 6,465,027 B1 * 10/2002 Taillade ................ A21D 8/047
426/62

FOREIGN PATENT DOCUMENTS

| | | |
|---|---|---|
| EP | 0953288 A1 | 11/1999 |
| EP | 1711062 A1 | 10/2006 |
| FR | 3040587 A1 | 3/2017 |
| WO | 2017060165 A1 | 4/2017 |

OTHER PUBLICATIONS

International Search Report issued on Jan. 30, 2023, in corresponding International Patent Application No. PCT/EP2022/079480; 6 pages.
Anonymous, “A Guide to Binders in Gluten-Free Sourdough Baking” www.culturesforhealth.com, May 22, 2016 (May 22, 2016), pp. 1-7, 7 pages.

(Continued)

*Primary Examiner* — Jenna A Watts
(74) *Attorney, Agent, or Firm* — Maier & Maier, PLLC

(57) ABSTRACT

A stabilized, ready-to-use live leaven comprising a mixture of liquid leaven and mucilaginous seeds, and the use of the stabilized, ready-to-use live leaven for preparing bakery products. Also, a method of fabricating the stabilized, ready-to-use live leaven, which includes mixing the liquid leaven and mucilaginous seeds, fermenting the mixture, and obtaining and storing the stabilized, ready-to-use live leaven.

19 Claims, 10 Drawing Sheets

(56) References Cited

OTHER PUBLICATIONS

Kishk Y.F.M., "Optimization of flaxseed mucilage extraction and its functional characteristics" Annals of Agriculture Science Moshtohor, vol. 42, No. 3, Jan. 1, 2004 (Jan. 1, 2004), pp. 1177-1197, 20 pages.

Tosif Mansuri M. et al., "A Comprehensive Review on Plant-Derived Mucilage: Characterization, Functional Properties, Applications, and Its Utilization for Nanocarrier Fabrication" POLYMERS, vol. 13, No. 7, Mar. 28, 2021 (Mar. 28, 2021), p. 1066, 24 pages.

* cited by examiner

[FIG. 1]

[FIG. 2]
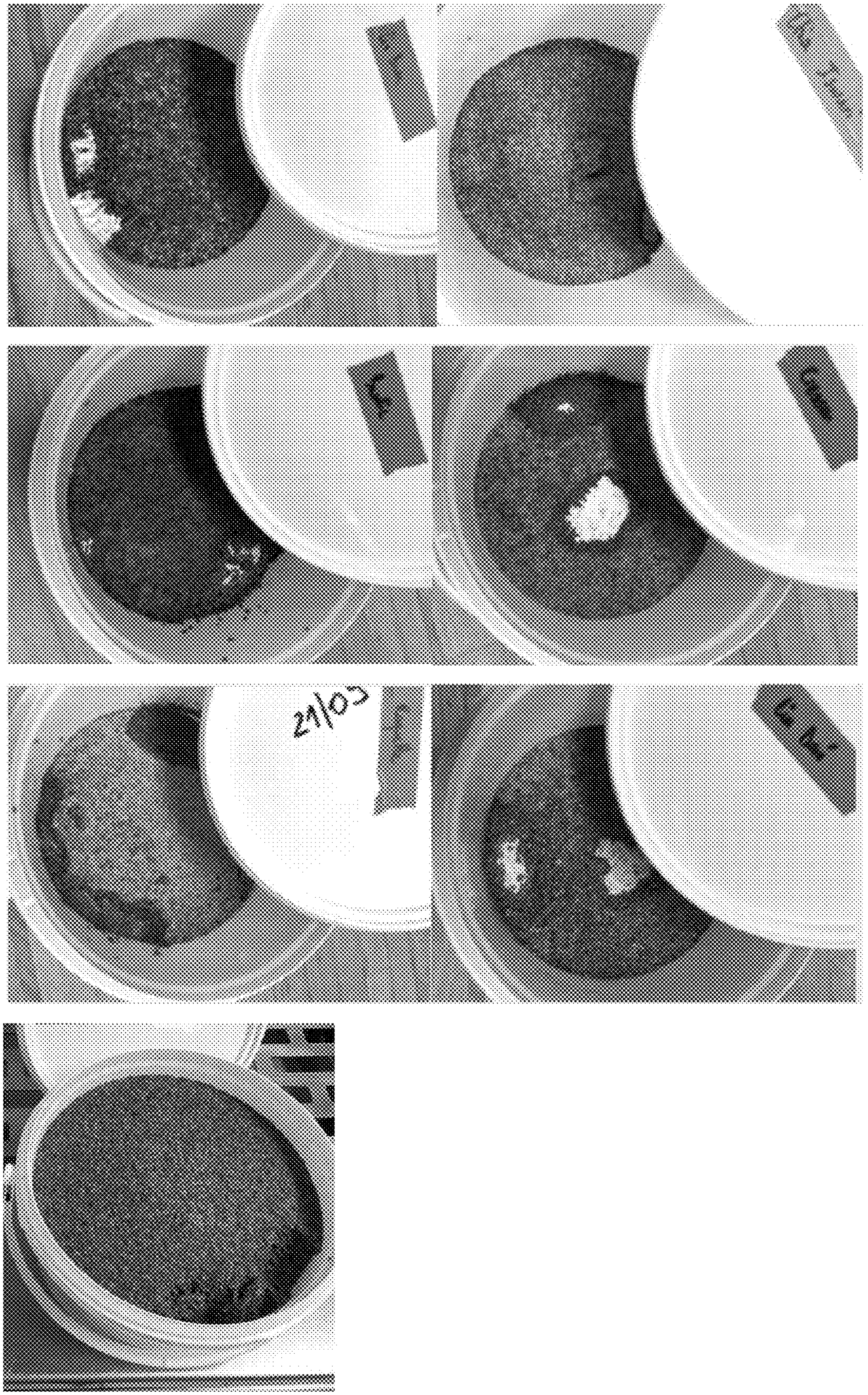

[FIG. 3]
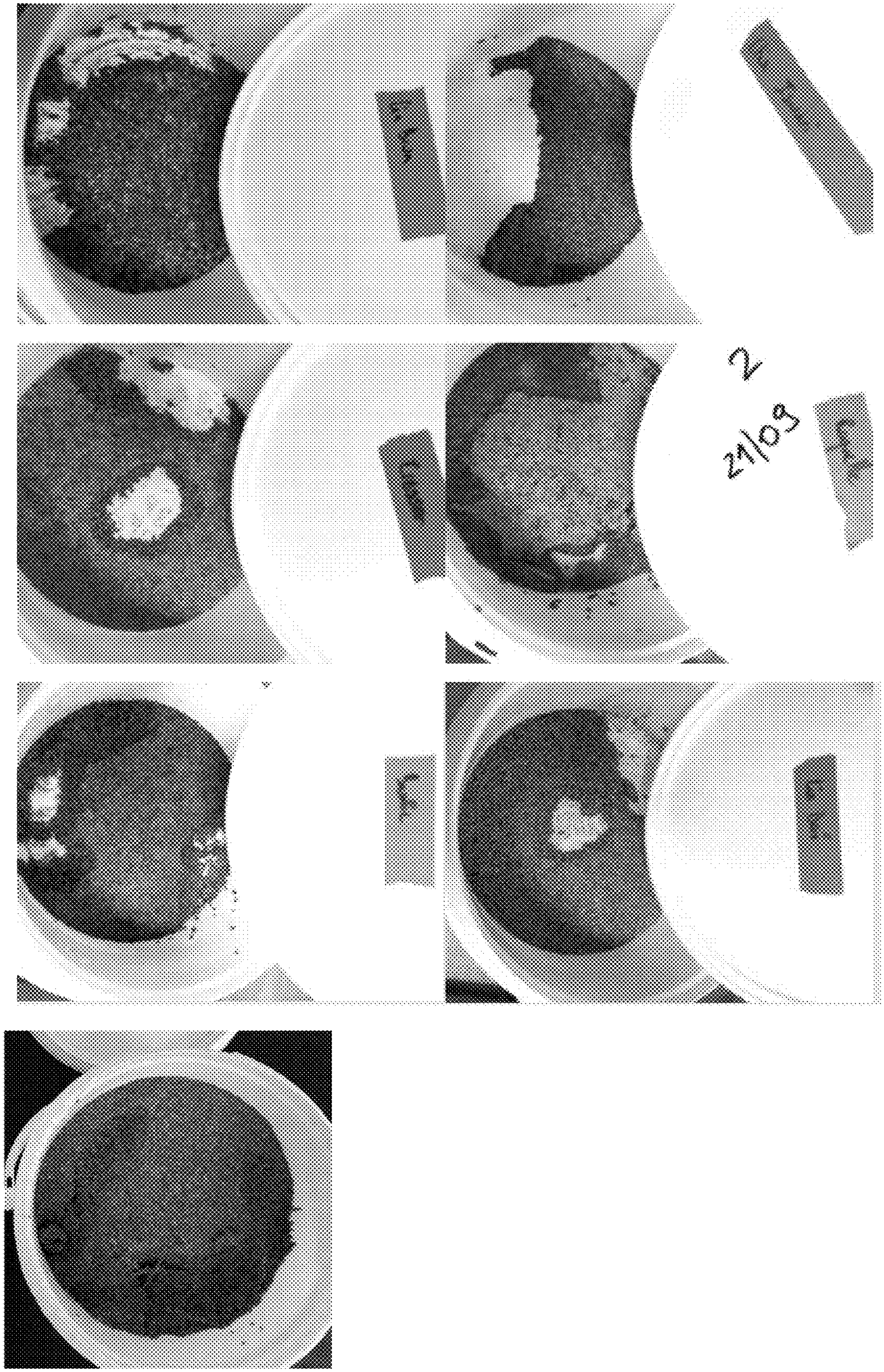

[FIG. 4]
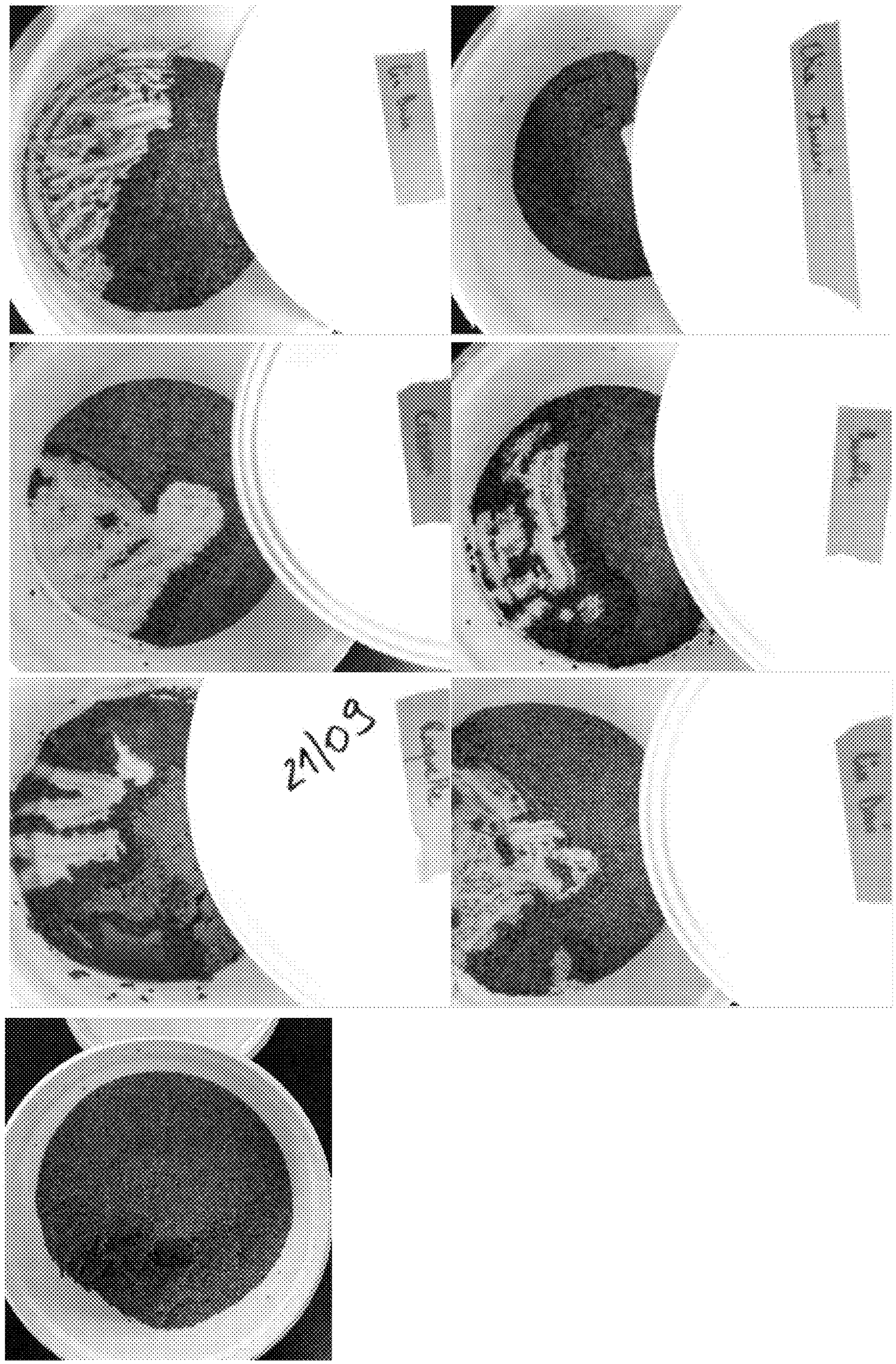

[Fig.5]
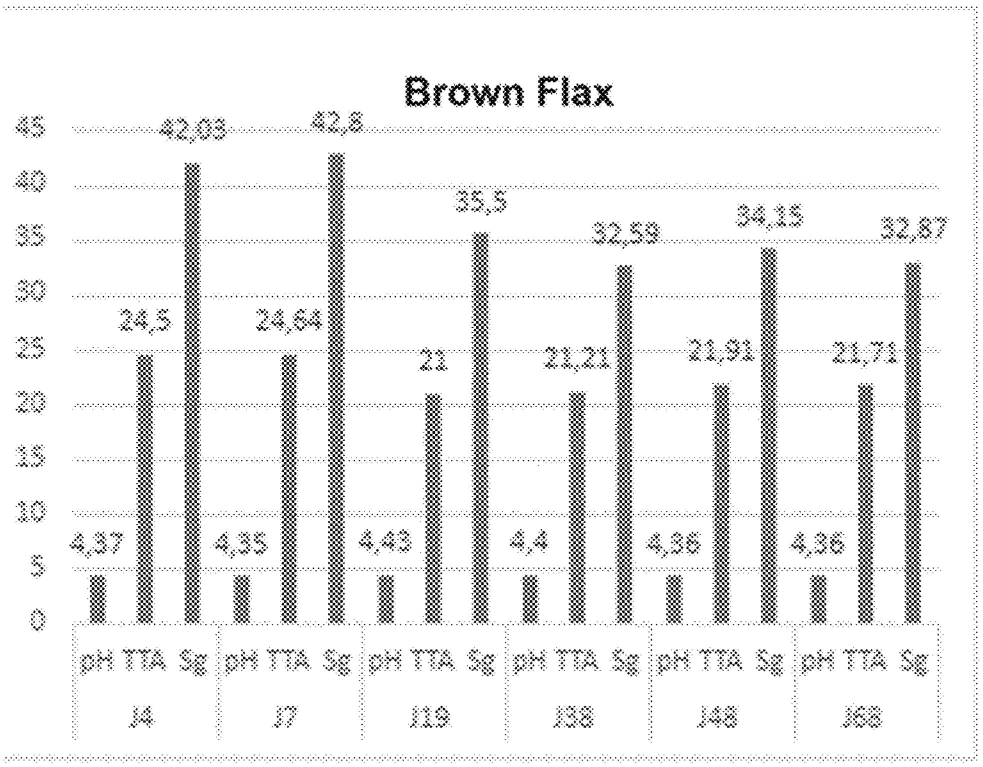
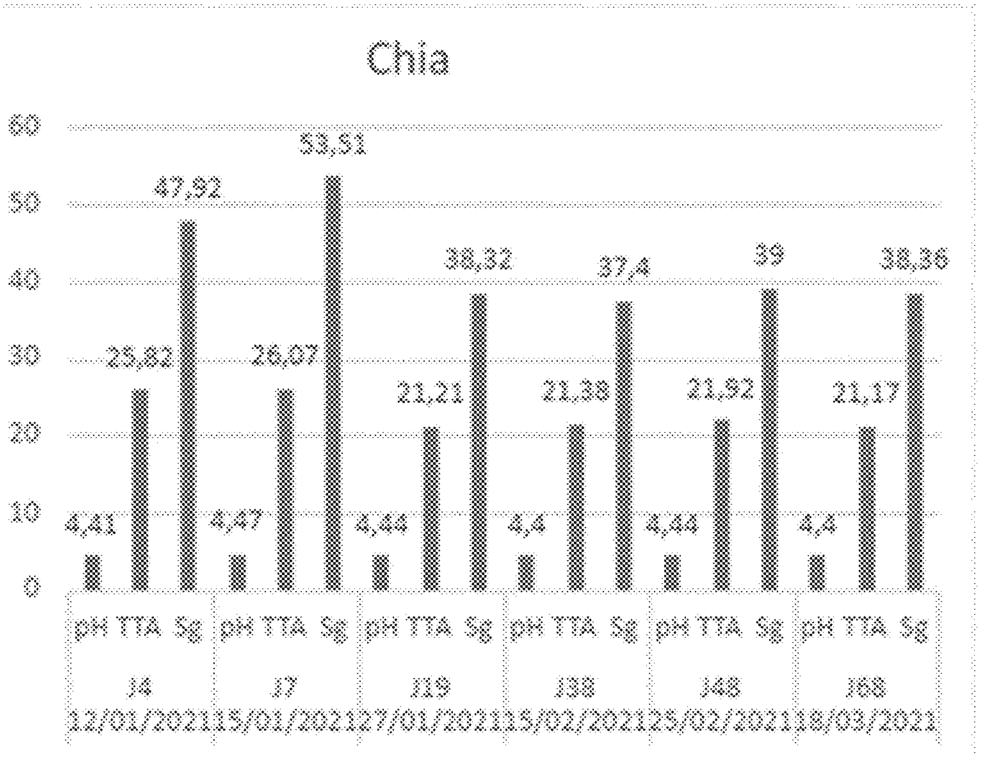

[Fig.6]
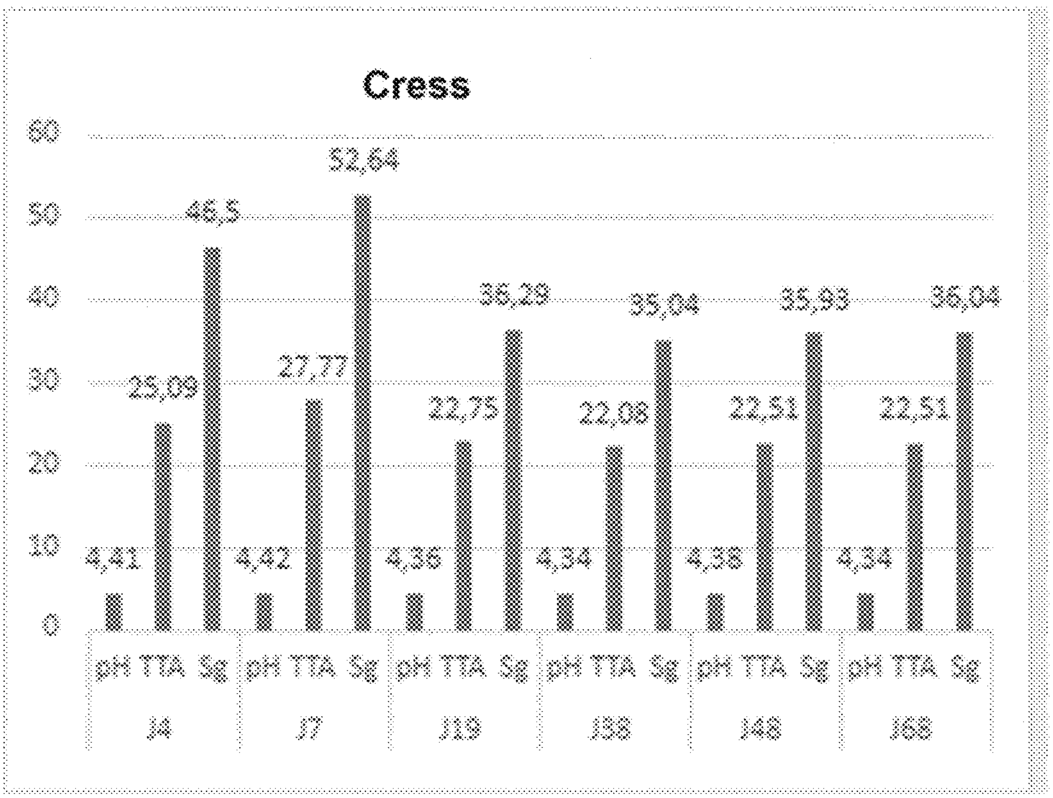
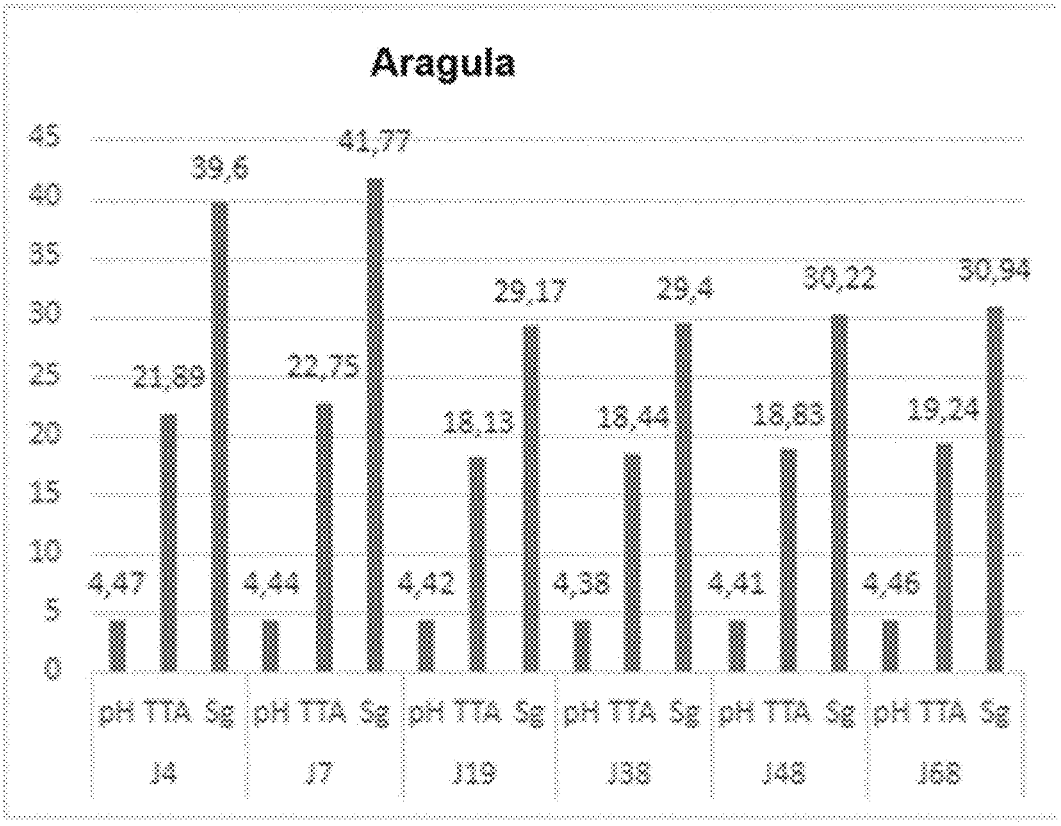

[Fig.7]
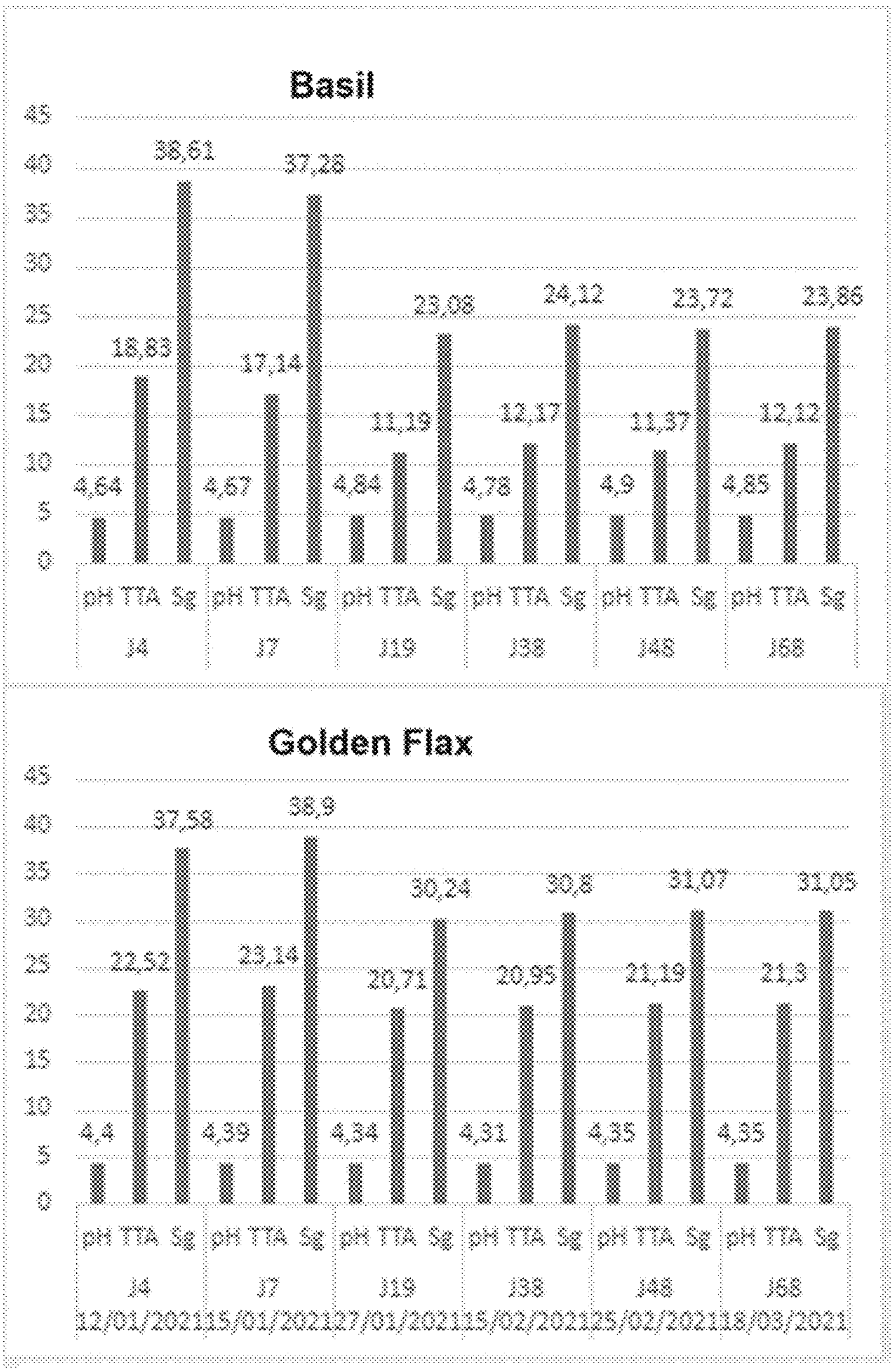

[Fig.8]
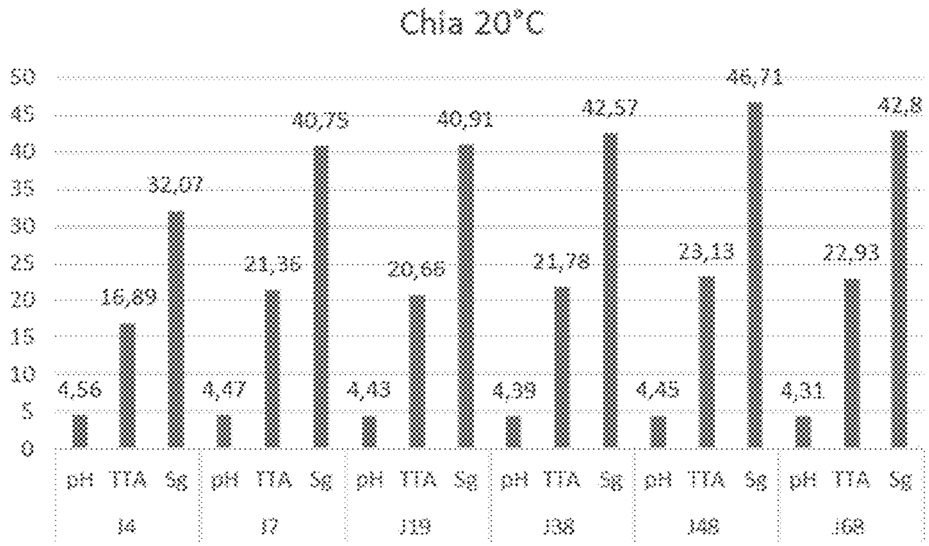

[Fig.9]
Clockwise from top: Ripe wheat smell, sourdough smell, seeds smell, malted/crackers smell, Ripe wheat flavor, Sourdough flavor, Seeds flavor, Malted/crackers flavor, salt, sour, bitter, crackers (crust), seeds (crust)
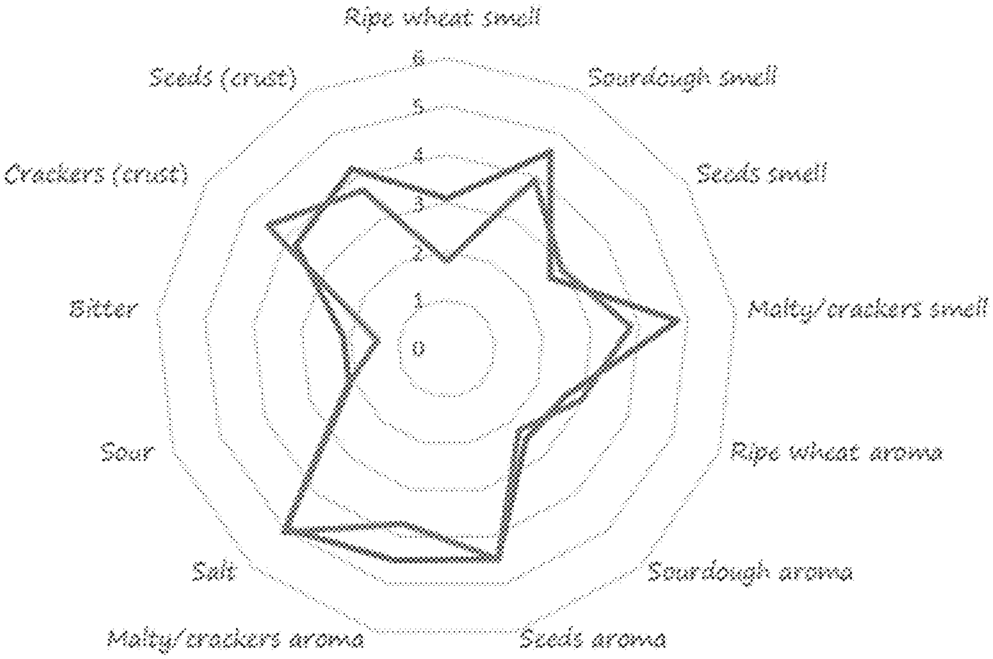

[FIG.10]

STABILIZED, READY-TO-USE LIVE LEAVEN

FIELD

The present invention belongs to the field of bread making, and more specifically to the field of leavens. The present invention relates to a stabilized, ready-to-use live leavens, the fabrication method of a live leaven, a bakery product comprising a live leaven and the use of a live leaven in the fabrication of bakery products.

BACKGROUND

Bread is an ancestral food constituting the staple food in many cultures. Bread, like any other product, has evolved over time in response to consumer trends.

Historically, leaven was the very first bread making ferment used in bread making before being gradually replaced by baker's yeast, with its industrial expansion. Nowadays, an increasingly stronger trend towards a return to the use of leavens in bread making exists. In fact, leavens give bread nutritional and organoleptic qualities that are appreciated by consumers seeking naturalness and who are increasingly demanding regarding the nutritional qualities of the bakery products that they consume. The applicant has therefore developed a full range of ready-to-use live leavens that facilitate the work of the baker by avoiding the constraints associated with the preparation of leavens, and their successive refreshings, while preserving the leaven advantages.

In addition, at the consumer level, a real enthusiasm has existed for several years for ingredients delivering nutritional-health benefits, and particularly for certain "superfoods" such as chia seeds or flax seeds. These mucilaginous seeds, rich in fiber, omega-3, minerals, and antioxidants, are renowned for their health benefits. They would be particularly effective in helping reduce the risk factors for cardiovascular diseases such as diabetes, hypercholesterolemia and hypertension, or else in contributing to good digestive system function.

In addition, as consumers are more and more concerned about food product compositions, the "clean label," "E-free," and "additive-free" trend is increasingly compelling. Consequently, it is customary to add stabilizers to live liquid leavens to prevent settling of non-soluble parts, such as microorganisms or cereal fractions, and a resuspending step before each use. In particular, xanthan gum (E415) is used for its thickening and gelling properties.

TECHNICAL PROBLEM

Therefore, a need exists for a stabilized, ready-to-use live leaven that is easy to use for the baker and which meets the expectations of current consumers.

SUMMARY

Faced with all of these problems, after intensive research, the inventors have succeeded in developing a stabilized, ready-to-use live leaven comprising a mixture of 55 to 75%, preferably 60 to 70%, preferably 67%, of liquid leaven by weight and 25 to 45%, preferably 30 to 40%, preferably 33%, of mucilaginous seeds by weight.

Another object of the invention is a method of obtaining a stabilized, ready-to-use live leaven comprising the following steps:

a) Mixing 55 to 75%, preferably 60 to 70%, preferably 67%, of liquid leaven by weight and 25 to 45%, preferably 30 to 40%, preferably 33%, of mucilaginous seeds by weight;

b) Fermentation of this mixture at a temperature of between 20 and 36° C., for a duration of between 80 and 170 hours;

c) Obtaining and storing the live leaven.

Another object of the invention is a bakery product containing 5 to 15% by weight of a live leaven according to the invention in its initial composition before baking, the percentage being expressed as a baker's percentage.

Another object of the invention is the use of a live leaven of the invention for the preparation of bakery products.

BRIEF DESCRIPTION OF THE FIGURES

Other features, details and advantages will appear upon reading the examples below, illustrated by the attached figures, in which:

FIG. 1 is a photograph illustrating the leavens obtained after co-fermentation according to different percentages of chia seeds.

FIG. 2 is a set of photographs illustrating the different ready-to-use live pasty leavens contained in buckets 4 days after the obtaining step (from left to right and from top to bottom, brown flax seeds, chia seeds fermentation 32° C., cress seeds, arugula seeds, basil seeds, golden flax seeds, chia seeds fermentation 20° C.).

FIG. 3 is a set of photographs illustrating the different ready-to-use live pasty leavens contained in buckets 38 days after the obtaining step (from left to right and from top to bottom, brown flax seeds, chia seeds fermentation 32° C., cress seeds, arugula seeds, basil seeds, golden flax seeds, chia seeds fermentation 20° C.).

FIG. 4 is a set of photographs illustrating the different ready-to-use live pasty leavens contained in buckets 68 days after the obtaining step (from left to right and from top to bottom, brown flax seeds, chia seeds fermentation 32° C., cress seeds, arugula seeds, basil seeds, golden flax seeds, chia seeds fermentation 20° C.).

FIG. 5 is a set of graphs illustrating the results of acidity parameter measurements of the leavens obtained in example 2.

FIG. 6 is a set of graphs illustrating the results of acidity parameter measurements of the leavens obtained in example 2.

FIG. 7 is a set of graphs illustrating the results of acidity parameter measurements of the leavens obtained in example 2.

FIG. 8 is a set of graphs illustrating the results of acidity parameter measurements of the leavens obtained in example 2.

FIG. 9 is a "spider-chart" illustrating the results of the sensory analysis from example 5.

FIG. 10 is a photograph of the leaven obtained in example 6.

DETAILED DESCRIPTION

According to a first object of the invention, a stabilized, ready-to-use live leaven comprising a mixture of 55 to 75% of liquid leaven, preferably 60 to 70%, and even more preferably 67% by weight, and 25 to 45% of mucilaginous seeds, preferably 30 to 40%, and even more preferably 33% by weight, is proposed.

Within the meaning of the present invention, "live leaven" refers to a mixture composed of at least flour and water in which yeasts and bacteria are developed, the function of which is to ensure the rise and acidification of the dough, particularly bread dough. The microorganisms of the leaven are developed either spontaneously or by the addition of starters that seed the leaven. Starters are compositions of defined bacteria and yeast strains that, once added to the flour and the water, enable a leaven to be obtained without refreshing steps and that guarantee the consistency of the leavens obtained. The leaven bacteria are acidifying bacteria, more specifically lactic bacteria, that produce lactic acid and acetic acid. The viability of the leaven is defined, first, by its acidity and, second, by its microbial population that demonstrates the existence of microbiological activity, and therefore its capacity to acidify and raise a baking dough. In particular, the Syndicat national des Fabricants de Produits intermédiaires pour boulangerie, pâtisserie et viennoiserie (SYFAB) indicates that the following values have been adopted to define the viability of a leaven:

pH<4.5

TTA>7 ml (see the definition in example 3)

lactic bacteria>$10^8$ CFU/g (Colony-Forming Unit)

Within the meaning of the present invention, a "stabilized" live leaven refers to a leaven that meets two conditions of stability. First, the leaven is stable physically: it maintains its initial physical state over time, without separation of its different components, such as settling or syneresis. Second, the leaven is stable in its capacity to acidify a baking dough over time, it also retains its acidifying characteristics (pH, TTA, Sg) over time, and therefore retains its active live leaven state.

The yeasts present in the live leaven according to the invention are conventional breadmaking yeasts, preferably they may be chosen from among *Saccharomyces cerevisiae, Saccharomyces chevalieri* or else *Candida humilis.*

The bacteria present in the live leaven according to the invention are preferably lactic bacteria and even more preferably lactic bacteria chosen from among *Lactobacillus casei, Lactobacillus brevis, Lactobacillus plantarum* or else *Lactobacillus sanfranciscensis.*

Within the meaning of the present invention, "liquid leaven" refers to a leaven in fluid form, that comprises between 5 and 40% of dry matter by weight. The liquid leaven comprises at least water, flour and microorganisms. It may also comprise bread improvers.

The flour of the liquid leaven may be chosen from among wheat flour, rye flour, chia flour, corn flour, buckwheat flour, barley flour, oat flour, spelt flour, quinoa flour, rice flour, corn flour, and mixtures thereof.

By way of indication, the Applicant markets such leavens under the trade references Crème de Levain® or Levain Vivant de Blé Dur® for example.

"Ready-to-Use" leaven, in the present invention, refers to a leaven that is directly usable by the operator, without prior agitation, and without having to carry out refreshings during storage of the leaven. A ready-to-use leaven is directly taken and added to the baking dough. According to the terminology of the person skilled in the art, this is an "any point" leaven, that is ready-to-use to prepare and raise the bread dough. A ready-to-use leaven therefore is not a leaven starter or primer that requires additional steps to obtain an operational leaven that is usable in breadmaking.

"Mucilaginous seeds" refers to seeds that comprise mucilages, substances composed of polysaccharides, that have the property of swelling when in contact with water, and which do not dissolve but instead form a viscous material. Preferably, mucilaginous seeds may be chosen from among basil seeds, chia seeds, cress seeds, flax seeds, arugula seeds, or mixtures thereof. This list includes the different varieties of species of the seeds indicated.

More preferably, the mucilaginous seeds incorporated in the live leaven according to the invention are chia seeds.

Advantageously, the live leaven according to the invention is very easy to use. Its ready-to-use form does not require any preparation action such as refreshings. Also, its physical stabilization prevents the operator from having to perform an inconvenient remixing step that takes time and involves physical handling that is difficult for the operator. In addition, the pre-dosed combination of mucilaginous seeds and live leaven prevents the operator from having to handle, dose, and weigh two different products. Outside of the percentages of mucilaginous seeds indicated, the results obtained are not satisfactory: the leaven is not stabilized enough and settles or, on the contrary, is too compact and thus difficult to handle and to incorporate into the baking dough. Also, this form makes it possible for the operator to avoid a necessary step of soaking the seeds, which enables good digestibility, better nutrient absorption by the organism and better organoleptic properties of the seeds, which are softer.

Advantageously, as the live leaven according to the invention is stabilized, it maintains a significant acidity over time which provides it with a long storage life. Therefore, the leaven of the invention has a storage life of at least 9 weeks, preferably 12 weeks and more preferably 14 weeks.

In a particular embodiment, the live leaven is in paste form.

Within the meaning of the present invention, a "pasty" live leaven is a leaven that contains a percentage of dry matter by weight of between 30 and 50%, preferably between 40 and 50%, and which resembles a paste, compact and capable of retaining its own form. A pasty leaven does not flow or flows very little and has to be handled with a specific tool, such as a plastic scraper.

Advantageously, the live leaven of the invention is very easy to use for the baker because, in addition to the advantages stated above, its pasty form enables it to be precisely dosed and easily handled by using a plastic scraper, for example. The pasty form limits handling and therefore enables the operator to save time. Also, its pasty form enables easy storage, in a bucket or a bag, for example.

The leaven according to the invention may contain bread improvers such as enzymes, deactivated yeasts, yeast derivatives, ascorbic acid. A yeast derivative according to the invention is defined as a fraction obtained during degradation of the yeast by physical or chemical action, for example by plasmolysis, hydrolysis or autolysis of the yeast. Yeast derived products are all products likely to be obtained from yeast cells that are whole or broken by physical or chemical action. They comprise, in particular, yeast extracts obtained by autolysis or autolysates, yeast hulls, mannoproteins, inactivated yeasts. They most often present in a more or less fine powder form after grinding or in suspension in a rehydration medium, in yeast cream form or in compressed yeast form. Advantageously, the yeast derivative is yeast hulls or yeast extract.

In a particular embodiment, the live leaven according to the invention has a storage life of at least 9 weeks, preferably 12 weeks and more preferably 14 weeks at a temperature of between 2 and 8° C., preferably 4° C.

Advantageously, such a pasty leaven is stored in positive cold, in an ordinary refrigerator and does not require inconvenient storage measures.

In a particular embodiment, the live leaven of the invention does not contain any texture additives. Texture additive is understood to refer to additives acting as thickeners and/or gelling agents such as xanthan gum (E415), agar-agar (E406), carob gum (E410), pectin (E440) or else guar gum (E412).

Preferably, the live leaven of the invention does not contain xanthan gum (E415).

Advantageously, the live leaven does not require the use of xanthan gum (E415) or any other texture additive aiming to prevent the settling or syneresis of the leaven. The inventors have ingeniously exploited the mucilaginous properties of the mucilaginous seeds to develop a "Clean-Label," "E-Free," "additive free" live leaven that therefore meets the requirements of consumers who are concerned about the composition of the food products that they consume.

According to another object of the invention, a method is proposed of fabricating a stabilized, ready-to-use live leaven comprising the following steps:

a) Mixing 55 to 75% of liquid leaven by weight, preferably 60 to 70%, preferably 67%, and 25 to 45% of mucilaginous seeds by weight, preferably 30 to 40%, preferably 33%;

b) Fermentation of this mixture at a temperature of between 20 and 36° C., for a duration of between 80 and 170 hours;

c) Obtaining and storing the live leaven.

Preferably, the mucilaginous seeds from step a) are chosen from among basil seeds, chia seeds, cress seeds, flax seeds, arugula seeds, or mixtures thereof. This list includes the different varieties of species of the seeds indicated.

More preferably, the mucilaginous seeds are chia seeds.

Preferably, in step b), the fermentation takes place for 168 hours at 20° C. or for 96 hours at 32° C.

It will become clear to the person skilled in the art that the fermentation time of the mixture correlates with the temperature at which the fermentation takes place. In fact, at a higher temperature, the fermentation reactions accelerate and, consequently, the fermentation time necessary for obtaining the stabilized live leaven according to the invention is shorter. The reverse is also true, at a lower fermentation temperature, the fermentation time necessary for obtaining the stabilized live leaven is longer.

In a particular embodiment, the method of fabricating a stabilized, ready-to-use live leaven comprises the following steps:

a) Mixing 55 to 75% of liquid leaven by weight, preferably 60 to 70%, preferably 67%, and 25 to 45%, preferably 30 to 40%, preferably 33% of mucilaginous seeds by weight;

b) Fermentation of this mixture at a temperature of between 28 and 36° C., preferably 32° C., for a duration of between 80 and 120 hours, preferably 96 hours;

c) Obtaining and storing the live leaven.

In a particular embodiment, the method of fabricating a stabilized, ready-to-use live leaven comprises the following steps:

a) Mixing 55 to 75% of liquid leaven by weight, preferably 60 to 70%, preferably 67%, and 25 to 45%, preferably 30 to 40%, preferably 33% of chia seeds by weight;

b) Fermentation of this mixture at a temperature of between 20 and 36° C., preferably 20° C., for a duration of between 80 and 170 hours, preferably 168 hours;

c) Obtaining and storing the live leaven.

In a particular embodiment, the live leaven obtained is stored at a temperature of between 2 and 8° C., preferably 4° C.

In a particular embodiment, the live leaven is stored for a duration of at least 9 weeks, preferably 12 weeks and more preferably 14 weeks at a temperature of between 2 and 8° C., preferably 4° C.

According to another object of the invention, the live leaven according to the invention is obtained by the method according to the invention.

According to another object of the invention, a bakery product containing 5 to 15% by weight, preferably 10%, of live leaven according to the invention in its initial composition before baking, the percentage being expressed as a baker's percentage, is proposed.

The so-called baker's percentage is a calculation method applied to the ratios of ingredients in the initial composition of the bakery product before baking in which the total mass of the flour always represents 100% and the mass of the other ingredients in the dough is calculated in relation to this flour mass.

Initial composition refers to the list of ingredients forming the baking dough from which the bakery products will be made.

Bakery products according to the invention refers to all the cooked food products manufactured and sold in a bakery such as breads, brioches, pastries, cakes, cookies or else crackers.

The flour used in the bakery product according to the invention may be chosen from among wheat flour, rye flour, chia flour, corn flour, buckwheat flour, barley flour, oat flour, spelt flour, quinoa flour, rice flour, corn flour, and mixtures thereof.

The bakery product according to the invention may also contain seeds directly added to the dough mixer, bread improvers, or else yeast.

Advantageously, the bakery product according to the invention is superior in taste to the bakery product obtained by directly incorporating to the dough mixer a liquid leaven and mucilaginous seeds in proportions similar to those of the invention. In fact, sensory analysis studies carried out by the inventors revealed that the live leaven of the invention contributes specific aromatic notes that are richer and more complex to the bakery product obtained. These aromatic notes are not obtained when the liquid leaven and mucilaginous seeds are directly incorporated to the dough mixer without a pre-mixing and pre-fermentation phase. The aromatic notes obtained depend on the mucilaginous seeds contained in the live leaven of the invention. In particular, the inventors have noted interesting "cracker," "sourdough," "pesto," and "tonka bean" notes.

Advantageously, the combination of mucilaginous seeds and live leaven provides nutritional advantages to the consumers. In fact, mucilaginous seeds are recognized for their well-being benefits.

Advantageously, the mucilaginous seeds contained in the leaven of the invention remain visible in the bakery product, giving the product an attractive appearance for the consumer.

According to another object of the invention, a use of a live leaven of the invention for the preparation of bakery products is proposed.

In a particular embodiment, the live leaven is incorporated at a ratio of 5 to 15% by weight in the initial composition before baking, the percentage being expressed as a baker's percentage.

EXAMPLES

Example 1: Preparation of Leavens According to Different Liquid Leaven/Chia Seed Ratios Step 1: mixtures of liquid leaven (Levain Vivant de Blé Dur® marketed by the Lesaffre company) with chia seeds according to the following proportions: 90/10, 80/20, 70/30, 67/33, 60/40 and 50/50.

Step 2: fermentation of the mixtures obtained for 96 hours at 32° C.

Step 3: obtaining and storing the live leaven in positive cold, in a refrigerator at 4° C.

The results obtained are seen in FIG. 1, the ratios are indicated in the containers from left to right: 90/10, 80/20, 70/30, 67/33, 60/40 and 50/50. It can be seen that the leavens produced with the 90/10 and 80/20 ratios present settling. These leavens are not stabilized. The leaven containing a 50/50 ratio is not satisfactory because the leaven obtained is too compact and solid and is thus difficult to handle and incorporate into the baking dough. These results support the criticality of the ratios chosen for executing the invention.

Example 2: Preparation of a Stabilized, Ready-To-Use Live Leaven

Step 1: mixture of 200 g of liquid leaven (Levain Vivant de Blé Dur® marketed by the Lesaffre company) with 100 g of chia seeds.

Step 2: fermentation of the mixtures obtained for 96 hours at 32° C.

Step 3: obtaining and storing the live leaven obtained in positive cold, in a refrigerator at 4° C.

The same obtaining method was applied for brown flax seeds, cress seeds, arugula seeds, basil seeds and golden flax seeds.

Another chia-seed based leaven was produced according to the following steps:

Step 1: mixture of 200 g of liquid leaven (Levain Vivant de Blé Dur® marketed by the Lesaffre company) with 100 g of chia seeds.

Step 2: fermentation of the mixture obtained for 168 hours at 20° C.

Step 3: obtaining and storing the live leaven obtained in positive cold, in a refrigerator at 4° C.

The leavens are stored in positive cold at 4° C. The leavens were observed at 4 days, 38 days and 68 days.

It is visible in FIG. 2, FIG. 3 and FIG. 4 that the leavens obtained have a pasty form that easily enables the operator to remove a portion of the leaven, using a plastic scraper for example, to weigh and incorporate the leaven into the dough mixer. It is also visible that the live leavens obtained are stabilized, they maintain a homogeneous form, without settling or syneresis, even after 68 days of storage at 4° C. This stabilized pasty form is obtained without any texture additive such as xanthan gum. The method developed by the inventors advantageously produces a "clean label," "E-free," and "additive free" pasty leaven.

Example 3: Analysis of the Stability of the Leavens Obtained in Example 2

As indicated above, it is possible to verify the stability of a leaven over time by ensuring that it retains its acidifying properties (pH, TTA, Sg) over time.

Therefore, the leavens from example 2 were sampled at 4 days, 7 days, 19 days, 38 days, 48 days and 68 days. Their pH, TTA and Sg were measured at these different times according to the protocol detailed below.

TTA, pH and Sg measurement protocol:

The principle is to measure the initial pH (pHi), always determined from a sample of 10 g of product at 20° C. in an aqueous solution, and the Total Titratable Acidity (TTA) and the Sauergrad (acidity) (Sg) by titrating with a solution at 0.1 N of NaOH.

The TTA (Total Titratable Acidity) corresponds to the required volume of a solution at 0.1 N of NaOH (in ml) to reach a pH of 6.6 for 10 g of sample in an aqueous solution at 20° C.

The Sg (Sauergrad (acidity)) corresponds to the required volume of a solution at 0.1 N of NaOH (in ml) to reach a pH of 8.5 for 10 g of sample in an aqueous solution at 20° C.

TABLE 1

| | Leaven |
|---|---|
| pH measurement | Weigh the sample in a 250-ml beaker: 10 ± 0.1 g of leaven, and note the mass m (g)<br>Prepare 90 g of distilled water and add 70 g of this quantity to the beaker<br>Mix with the magnetic stirrer until complete homogenization or dissolution<br>Fill the beaker by rinsing with the remaining quantity of distilled water<br>Record (pHi), still carried out on 10 g of product in an aqueous solution at 20° C. in 90 g of distilled water |
| TTA measurement | Use a pH meter and titrate by adding a solution at 0.1N of NaOH until a pH of 6.6 is reached and record the required volume V |
| Sg measurement | Use a pH meter and titrate by adding a solution at 0.1N of NaOH until a pH of 8.5 is reached and record the required volume V |

Exploitation of the Results:

The TTA is expressed in ml of a solution at 0.1 N NaOH per 10 grams of sample at pH 6.6

$$TTA=(V\times 10)/m$$

In which:

$V$ = Volume of 0.1$N$ of NaOH in ml $m$ = mass of the sample in g

10 = factor for 10 g

The $TTA$ is expressed in ml/10 g.

The Sauergrad is expressed in ml of a solution at 0.1 N NaOH per 10 grams of sample at pH 8.5.

$$\text{Sauergrad} = (V \times 10)/m$$

In which:

$V$ = Volume of 0.1$N$ of NaOH in ml $m$ = mass of the sample in g

10 = factor for 10 g

The Sauergrad is expressed in ml/10 g.

The graphs from FIGS. 5 to 8 illustrate the results obtained for the different live leavens according to the invention.

After an acidity peak on D7, the measured values are stable at least until D68. These results demonstrate that the leavens maintain stable acidity parameters. This acidity reflects a process of acidification that had come to an end, naturally stabilizing the biomass in a fixed ecosystem that supports its maintenance. These parameters demonstrate the viability and stability of the general population of microorganisms that make up the leaven. The leavens according to the invention are therefore live leavens. These parameters demonstrate that the leavens are sufficiently acidic up to at least 68 days to acidify a bakery dough.

An additional analysis was carried out in order to count the lactic bacteria present in the leaven comprising chia seeds from example 2. The following results were obtained:

480 000 000 CFU/g after 8 days;

440 000 000 CFU/g after 59 days;

390 000 000 CFU/g after 94 days;

These results agree with the viability criterion stated by SYFAB (lactic bacteria>$10^8$ CFU/g).

This example illustrates that the leavens obtained according to the invention are live stabilized leavens.

Example 4: Preparation of Baguettes with the Live Leaven of the Invention, Sensory and Nutritional Analyses 3 different types of baguettes are prepared:

- Control baguette 1: control baguette, with the two ingredients Levain Vivant de Blé Dur® and chia seeds directly added to the dough mixer up to 10% of the total;
- Baguette 2: baguette according to the invention with the addition of 7.5% of live leaven to the chia seeds according to the invention;
- Baguette 3: baguette according to the invention with the addition of 10% of live leaven to the chia seeds according to the invention.

The percentages are expressed as a baker's percentage.

The baguettes were prepared with Levains Vivants de Blé Dur® or leavens of the invention aged from 1 day, 2 weeks, 4 weeks, 7 weeks and 8 weeks.

TABLE 2

| Ingredients | Control baguette 1 | Baguette 2 | Baguette 3 |
|---|---|---|---|
| Flour | 2000 g | 2000 g | 2000 g |
| Water | 1400 g | 1400 g | 1400 g |
| Salt | 36 g | 36 g | 36 g |
| Yeast | 16 g | 16 g | 16 g |
| Levain Blé Dur ® | 133 g | 0 g | 0 g |
| Chia seeds | 67 g | 0 g | 0 g |
| Leaven of the invention | 0 g | 150 g | 200 g |

The bread doughs obtained are then conventionally worked according to the baguette fabrication method well known to the person skilled in the art.

Sensory Analysis of the Baquettes Obtained

The baguettes were then analyzed by a panel of tasters.

TABLE 3

| | 1 day | 2 weeks | 4 weeks | 7 weeks | 8 weeks |
|---|---|---|---|---|---|
| Control baguette 1 | Flat | Seeds, slight sourdough, no Crackers | Ripe wheat | Ripe wheat, little sour | Ripe wheat, Seeds++ |
| Baguette 2 | Crackers, slight sour, slight bitterness on the finish | crackers+++, sourdough+, seeds+, a little "green" crust++, bitter+ | Crackers++, seeds, slight astringent, little sour | Crackers+, sourdough, seeds | Crackers, Sourdough, Crust crackers, a little metallic |
| Baguette 3 | Crackers++, slight bitterness on the finish | crackers++, sourdough+, seeds+ crust+, bitter+ | Crackers++, sourdough, seeds, bitter, astringent, little sour | Seeds+, Crackers+++, bitterness on certain seeds | Sourdough++, Seeds++, Hint of bitterness (rest slight) |

The pronounced sourdough tastes obtained illustrate the capacity of the live leaven of the invention to acidify a baking dough even after 8 weeks of storage.

This example illustrates the interest of the live leaven of the invention because the aromatic notes obtained in the baguettes obtained are richer, more complex and more original than with a control mixture of Levain Vivant de Blé Dur® and chia seeds directly made in the dough mixer.

The use of a live leaven of the invention enables specific aromatic notes according to the mucilaginous seeds incorporated into the liquid leaven to be obtained. In this example, it is noted that a live leaven with chia seeds will contribute a "crackers" and "sourdough" taste.

The inventors carried out the same experiment with other types of mucilaginous seeds. Leavens according to the invention were prepared with brown flax seeds, cress seeds, arugula seeds, basil seeds and golden flax seeds. The live leavens were stored 10 days at 4° C. and were incorporated into the baking doughs for the fabrication of baguettes up to 7.5% (baker's percentage).

The baguettes were then analyzed by a panel of tasters.

TABLE 4

| | Leaven baguette on mucilaginous brown flax seeds | Leaven baguette on mucilaginous cress seeds | Leaven baguette on mucilaginous arugula seeds | Leaven baguette on mucilaginous basil seeds | Leaven baguette on mucilaginous golden flax seeds |
|---|---|---|---|---|---|
| Olfactory analysis | Peanut, hay | Anise | Asparagus | Cumin, pesto, fat | Ripe wheat |
| Gustative analysis | Bitter, sweet, ripe wheat | Spices, tonka bean, acid | Radish | Oil, spice, pesto | Ripe wheat |

These results illustrate that the live leavens of the invention enable the development of original aromatic notes that vary according to the type of mucilaginous seeds incorporated.

Comparative nutritional analyses were carried out on Baguettes 1 and 3. It was observed that the energy values, quantities of polyunsaturated fatty acids and more specifically of omega-3 in the finished products are equivalent for both types of baguettes. Therefore, the leaven according to the invention provides an equivalent nutrient intake and complies with current European Union regulations on the health claims of omega-3 (Regulation (EC) No. 1924/2006 of the European Parliament and of the Council of 20 Dec. 2006). However, the leaven according to the invention is superior in terms of convenience since the user has a ready-to-use product that does not require any preparatory step before being added to the dough mixer.

Example 5: Impacts of the Leaven Temperature/Fermentation Time Pair on the Organoleptic Properties of the Bakery Products Two leavens according to the invention were prepared at a ratio 33% of chia seeds, 67% of liquid leaven:

leaven 1 is fermented at 32° C. for 90 hours;

leaven 2 is fermented at 20° C. for 168 hours.

The leavens are stored in positive cold at 4° C. for 94 days. The leavens are used in baguette making according to the following recipe:

TABLE 5

| Ingredients | Baguette 1 | Baguette 2 |
|---|---|---|
| Flour | 2000 g | 2000 g |
| Water | 1400 g | 1400 g |
| Salt | 36 g | 36 g |
| Yeast | 16 g | 16 g |
| Leaven 1 | 200 g | 0 g |
| Leaven 2 | 0 g | 200 g |

The bread doughs obtained are then conventionally worked according to the baguette fabrication method well known to the person skilled in the art.

The baguettes were tasted by an expert panel of 10 tasters, the results are presented in FIG. 9 in the form of a "spider chart." It is visible in FIG. 9 that the sensory analysis results are identical for the baguettes obtained from a leaven according to the invention fermented for 90 hours at 32° C. or 168 hours at 20° C.

Example 6: Comparison Between the Fermented Co-Mixture Containing Chia Seeds and a Fermented Liquid Leaven with an Addition of Traditional Wheat Flour The method according to the invention was resumed but the mucilaginous seeds were replaced by traditional wheat flour:

Step 1: mixture of 200 g of liquid leaven (Levain Vivant de Blé Dur® marketed by the Lesaffre company) with 100 g of traditional wheat flour.

Step 2: fermentation of the mixture obtained for 96 hours at 32° C.

Step 3: obtaining and storing the live leaven obtained in positive cold, in a refrigerator at 4° C.

It is visible in FIG. 10 that the live leaven obtained remains liquid. Unlike the leaven obtained according to the invention, the leaven with the addition of traditional wheat flour does not take on a pasty consistency. This observation upholds that the method according to the invention enables the mucilaginous properties of the incorporated seeds to be exploited to obtain a pasty, ready-to-use leaven.

The invention claimed is:

1. A stabilized, ready-to-use live leaven comprising a mixture of 55 to 75% of liquid leaven by weight and 25 to 45% of mucilaginous seeds by weight.

2. The live leaven according to claim 1, wherein the mucilaginous seeds are selected from the group consisting of flax seeds, chia seeds, cress seeds, arugula seeds, basil seeds, and mixtures thereof.

3. The live leaven according to claim 1, wherein the live leaven is in pasty form.

4. The live leaven according to claim 1, wherein the live leaven has a storage life of at least 9 weeks at a temperature of between 2 and 8° C.

5. The live leaven according to claim 1, wherein the live leaven does not contain any texture additives.

6. A method of fabricating a stabilized, ready-to-use live leaven, comprising the following steps:

a) mixing 55 to 75% of liquid leaven by weight and 25 to 45% of mucilaginous seeds by weight;

b) fermenting this mixture at a temperature of between 2° and 36° C., for a duration of between 80 and 170 hours;

c) obtaining and storing the live leaven.

7. The method according to claim 6, wherein the live leaven is stored at a temperature of between 2 and 8° C.

8. The method according to claim 7, wherein the live leaven obtained is stored for a duration of at least 9 weeks at a temperature of between 2 and 8° C.

9. A bakery product containing 5 to 15% by weight of the live leaven according to claim 1 as an initial composition before baking, the percentage being expressed as a baker's percentage.

10. A method of preparing a bakery product, comprising incorporating the live leaven according to claim 1 into an initial composition of the bakery product before baking.

11. The method according to claim 10, wherein the live leaven is incorporated into the initial composition at an incorporation rate from 5 to 15% by weight, the percentage being expressed as a baker's percentage.

12. The live leaven according to claim 1, wherein the live leaven comprises a mixture of 60 to 70% of liquid leaven by weight.

13. The live leaven according to claim 1, wherein the live leaven comprises a mixture of 67% of liquid leaven by weight.

14. The live leaven according to claim 1, wherein the live leaven comprises 30 to 40% of mucilaginous seeds by weight.

15. The live leaven according to claim 1, wherein the live leaven comprises 33% of mucilaginous seeds by weight.

16. The live leaven according to claim 4, wherein the live leaven has a storage life of at least 12 weeks.

17. The live leaven according to claim 4, wherein the live leaven has a storage life of at least 14 weeks.

18. The live leaven according to claim 4, wherein the live leaven has a storage life of at least 9 weeks at a temperature of 4° C.

19. The live leaven according to claim 5, wherein the live leaven does not contain the texture additive of xanthan gum.

* * * * *